Nov. 21, 1967 D. L. BURDORF ETAL 3,353,734

DRIVE SYSTEMS INVOLVING ELECTROSTATIC FORCES

Filed April 3, 1963 3 Sheets-Sheet 1

DONALD L. BURDORF
JAMES T. BLAKISTONE
IRVING KARSH
INVENTORS.

BY Lyon & Lyon
ATTORNEYS.

DRIVE SYSTEMS INVOLVING ELECTROSTATIC FORCES

Filed April 3, 1963 3 Sheets-Sheet 2

DONALD L. BURDORF
JAMES T. BLAKISTONE
IRVING KARSH
INVENTORS.

BY Lyon & Lyon

ATTORNEYS.

DRIVE SYSTEMS INVOLVING ELECTROSTATIC FORCES

Filed April 3, 1963 3 Sheets-Sheet 3

DONALD L. BURDORF
JAMES T. BLAKISTONE
IRVING KARSH
INVENTORS.

BY Lyon & Lyon

ATTORNEYS.

United States Patent Office
3,353,734
Patented Nov. 21, 1967

3,353,734
DRIVE SYSTEMS INVOLVING ELECTROSTATIC FORCES

Donald L. Burdorf, Arcadia, and James T. Blakistone and Irving Karsh, Los Angeles, Calif., assignors to Kinelogic Corporation, Pasadena, Calif., a corporation of California Filed Apr. 3, 1963, Ser. No. 270,243
8 Claims. (Cl. 226—94)

The present invention relates to means and techniques involving the development of electrostatic forces for accomplishing and controlling movement of a web.

The invention is particularly useful in accomplishing a rapid acceleration and deceleration of a tape in a digital tape drive system used in conjunction with automatic digital computers wherein digital information is recorded and/or reproduced.

The term "tape" as used above and herein is used in a broad sense and is intended to include any data storage means which includes, but is not limited to, magnetic tape, perforated tape, film and the like.

The invention may be incorporated in a tape deck used in instrumented data-handling systems, either of the digital or analog type, such tape deck embodying means for developing electrostatic forces that act on a tape for moving and stopping the same with transducer means associated with the tape for producing recordings and/or reproductions of information on the tape, together with circuitry coupled to such transducer means and handling such information.

One of the principal problems in the design of digital transports involves the mechanism whereby a tape is started and stopped at very high rates, on the order of 1 to 10 milliseconds. To accomplish the resulting rapid acceleration and deceleration, extremely fast-acting mechanical elements have been used involving very high-speed solenoid-actuated pressure rollers; and in some cases the use of air pressure and vacuum to couple and decouple the tape to rollers and stationary posts for starting and stopping the tape. These arrangements have certain disadvantages in that they impose high stresses on the tape due to the high impact of a pressure roller as it pushes the tape into the driving roller and also there is a lack of reliability occasioned by very long duty cycles involving millions of mechanical operations under high impact conditions.

An object of the present invention is to provide improved means and techniques for coupling of recording tape to a moving element with minimum mechanical stress and wear in and of the tape with a high order of reliability.

This object is obtained generally by disposing the tape, having the quality of a dielectric, between two closely spaced parallel endless Mylar (T.M.) belts, of a dielectric material, preferably one capable of sustaining a high voltage gradient and with a high dielectric constant, one surface of which is at least partially coated with a circumferentially extending film of conducting material. In one embodiment of the invention taut belts are used which continuously move, while in another embodiment of the invention a slack belt arrangement is provided wherein belts are moved only when voltage is applied between continuously rotating rollers. In such case, an electrostatic attractive force is developed between two belts between which is disposed in parallel relationship the tape to clamp or couple the tape between such belts and to pull or move the tape at the speed of the belts.

In digital transports it is important that the tape be stopped quickly and an arrangement is incorporated to bring the tape to a halt by charging a pair of stationary posts to develop electrostatic clamping force on the tape between the belts, tape and stationary posts.

Another important feature and object of the present invention is to provide an arrangement whereby the tape may be thus run in a forward direction or in a reverse direction, i.e. the tape transport system has bidirectional operating capabilities.

Another object of the present invention is to provide a system of this character that incorporates means for discharging previously charged belts to thereby assure proper and quick operating response.

Another object of the present invention is to provide a system of this type characterized by its simplicity, reliability and drastically reduced wear on the tape.

Another object of the present invention is to provide a digital tape transport system that gently handles the tape and which involves coupling elements which are light and hence have relatively small inertia forces developed thereon in acceleration and deceleration of the tape.

Another object of the present invention is to provide an improved tape transport system of this character wherein the tape-engaging elements are required to move only through a small distance in accomplishing a coupling to and decoupling from the tape.

Another object of the present invention is to provide a tape transport system which is capable of rapidly starting and stopping movement of a tape in predictable distances featured by the fact that the tape is handled gently and in a reliable manner over long periods of time with minimum maintenance.

Another important object of the present invention is to provide a tape transport system of this character that embodies a pair of generally parallel extending slack conductive belts, each of which runs over a rotating pulley at one end and a fixed post at the other end, together with control circuitry that selectively applies a voltage to either the adjacent pair of rotating pulleys or to the adjacent pair of fixed posts for starting and stopping tape extending between such pair of parallel slack belts.

Another object of the present invention is to provide a tape transport system of this character which obviates the necessity of brushes or like elements contacting a conductive portion of a belt.

Another object of the present invention is to provide a tape transport system of this character wherein the tape is in the form of a dielectric in a capacitor which is serially connected in an intermediate position between two capacitors.

Another object of the present invention is to provide a system of this character wherein a single pair of belts is used both to drive a tape and to stop movement of the tape.

Another object of the present invention is to provide a system of the character mentioned in the preceding paragraph wherein means are provided for assuring interdependency of the driving and stopping functions.

Another object of the present invention is to provide a tape transport system of this character which involves a pair of parallel extending belts formed from a dielectric material which incorporates a conductive bond, with each belt travelling over a continuously rotating roller and a stationary post and wherein means are provided to selectively energize adjacent rollers and adjacent posts, the same also incorporating means for applying an equalizing or stabilizing voltage to that pair of rollers or posts simultaneously respectively with the application of a stopping and starting voltage to such rollers and posts.

Another object of the present invention is to provide a tape transport system of this character that involves the use of a plurality of conductive coatings on the belt with one conductive coating cooperating with a continuously rotating roller and the other conductive coating cooperating with a stationary post to assure starting and stopping functions.

Another object of the present invention is to provide a tape transport system of this character wherein a dielectric belt is provided with a conductive coating serving to contact the tape and the other conductive coating serving to contact a driving pulley, the last-mentioned conductive coating being semiconductive and serving the function of preventing erosion of the tape in operation of the system due to otherwise possible spark discharge.

Another object of the present invention is to provide an electrostatic clutching arrangement for selectively coupling a driving shaft to a driven shaft.

Another object of the present invention is to provide a clutching system for coupling a driven shaft to either one of two oppositely rotating driving shafts to correspondingly rotate the driven shaft in either a forward direction or a reverse direction.

Another object of the present invention is to provide a digital tape drive system of this character in which tape coupling belts formed from dielectric material are provided with a plurality of coatings, with means incorporated for applying out-of-phase voltages to the individual conductive coatings for assuring the development of constantly acting attractive forces.

Another object of the present invention is to provide an improved tape drive system which does not involve delays due to time constants of electromagnetic elements.

Another object of the present invention is to provide a system of this character in which tape is transported in clamped fashion over a relatively long linear distance while precisely guided with respect to a transducer for achieving low skew, i.e. for maintaining precisely at all times a particular orientation of the tape with respect to a transducer.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1, 18:
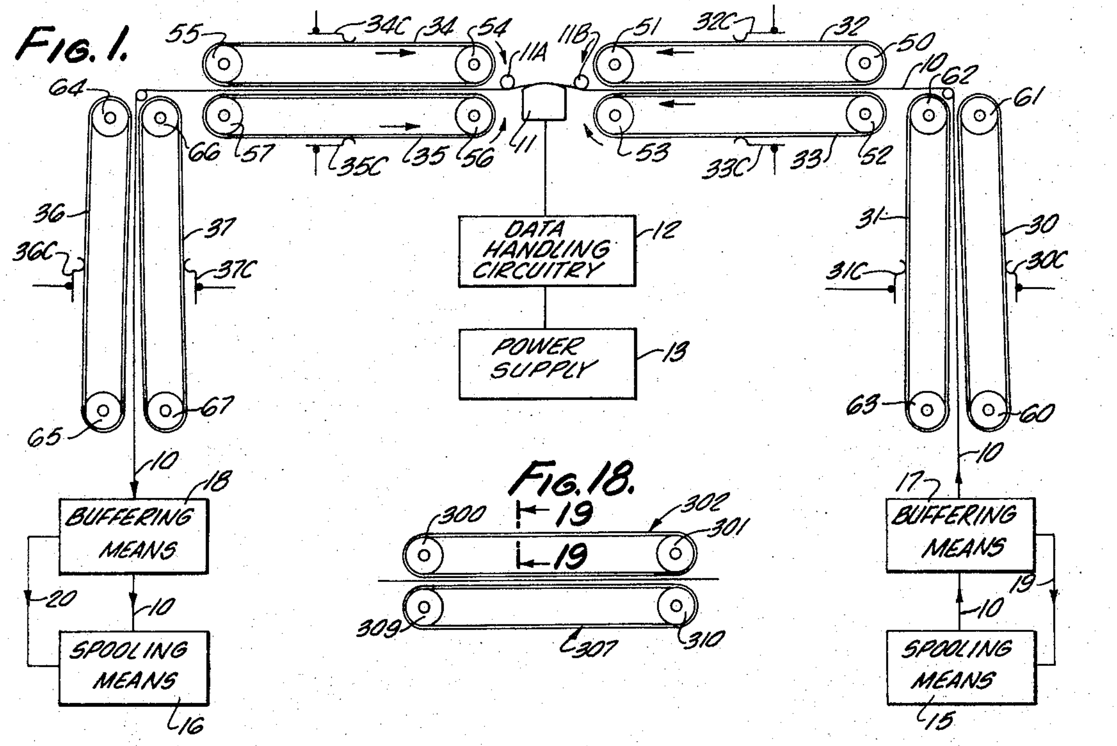
FIGURE 1 illustrates a system embodying features of the present invention.

FIGURE 18 serves to illustrate other modifications of the present invention.

Figure 19:
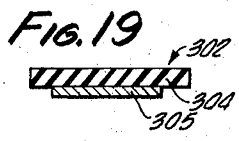

FIGURE 19 is a section taken along line 19—19 of FIGURE 18.

Referring to one form of the invention illustrated in connection with FIGURES 1 and 2, the system shown therein includes a conventional magnetizable and demagnetizable tape 10 cooperating both mechanically and magnetically with conventional transducer means 11 for purposes of recording and/or reproducing data information on tape 10. The transducer means 11 is coupled to conventional circuitry 12 for handling such information, and such circuitry 12 is supplied with the necessary operating voltages from power supply 13.

The tape 10, using means presently described, is selectively moved either to the left or to the right with respect to the stationary transducer means 11 having associated guide pins 11A, 11B for correspondingly reeling or spooling such tape 10 from the spooling means 15 onto the spooling means 16 or from the spooling means 16 onto the spooling means 15. In such reeling and unreeling of tape, the same is subjected to buffering means 17 associated with spooling means 15 and buffering means 18 associated with spooling means 16. Such buffering means 17, 18 senses the movement or positioning of tape and controls the corresponding spooling means through a coupling therebetween represented by the lines 19 and 20.

Figure 3:
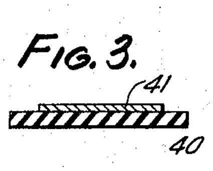
FIGURE 3 is a cross-sectional view through one of the belts illustrated in FIGURE 1.

The tape 10 travels between four pairs of belts 30, 31; 32, 33; 34, 35; 36, 37, each of which is of special construction and which are selectively energized to produce either forward or reverse movement of tape 10. Each belt, as represented in cross-section in FIGURE 3, is of insulating material, preferably of Mylar (T.M.), 40 having a conductive coating 41 on the outer side thereof, the conductive coating on each belt being contacted by an electrical contacting brush as illustrated in FIGURES 1 and 2.

The belts 32, 33, 34 and 35 pass over a corresponding pair of rotatable rollers, rotatable about fixed axes, the belt 32 passing over rollers 50, 51; the belt 33 passing over rollers 52, 53; the belt 34 passing over rollers 54, 55; and the belt 35 passing over rollers 56, 57. The rollers 53, 56 are continuously driven and thus constantly rotate, the roller 53 in the clockwise direction and roller 56 in the counterclockwise direction in FIGURE 1.

The other two pairs of belts 30, 31 and 36, 37 extend around fixed posts, the belt 30 extending around fixed post 60, 61; the belt 31 extending around post 62, 63; the belt 36 extending around post 64, 65; and the belt 37 extending around post 66, 67. If desired, the belt pair 36, 37 and belt pair 30, 31 may be replaced by stationary conductive strips of Mylar since such belt pairs are not required to travel around pulleys.

As mentioned above, each of the belts has an outer conductive coating extending completely around its outer side. Such conductive coating may be considered to be equivalent to a separate conductive belt around a belt of insulating material. For convenience in referencing the elements of a composite belt, letters are used in designating the components of the composite belt. Thus, for example, referring to belt 32, it has the reference numeral 32, the portion of insulation is designated at 32A, the electrical conductive portion is designated as 32B, and the brush, which electrically contacts the conducting portion of the belt, is designated as 32C. This nomenclature is followed using the letters A, B, and C in the following description of FIGURE 2.

Figure 2:
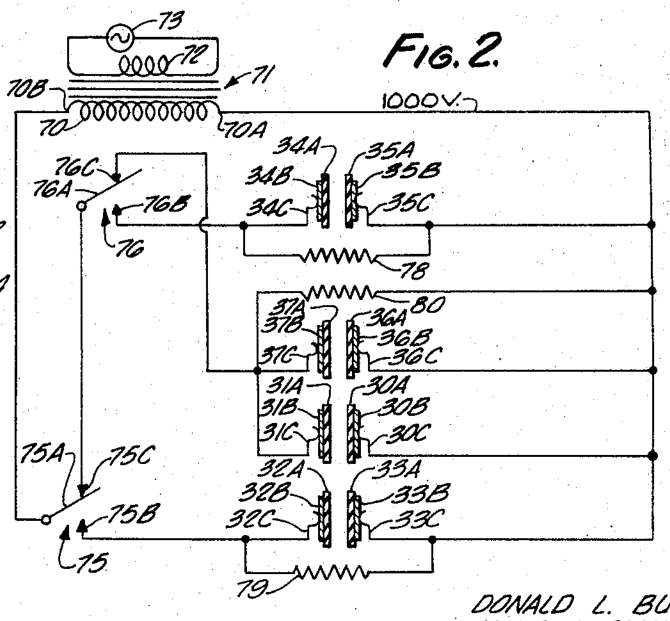
FIGURE 2 illustrates a control circuit for the system shown in FIGURE 1.

In FIGURE 2, the belt system is connected to the secondary winding 70 of a step-up transformer 71 having its primary winding 72 connected across terminals of the AC source 73 of, for example, 115 volts. The output voltage of the secondary winding 70 may be between 1000 and 2000 volts. One terminal 70A of winding 70 is connected to each of the brushes 35C, 36C, 30C and 33C. The other terminal 70B is connected to the movable arm 75A of a single-pole, double-throw switch 75 which may be referred to as a reversing switch and which has one of its stationary contacts 75B connected to brush 32C and the other one of its stationary contacts 75C connected to the movable arm 76A of a single-pole, double-throw switch 76. Such switch 76 may be referred to as the forward switch and has one of its stationary contacts 76B connected to brush 34C, the other stationary contact 76C being connected to brushes 37C and 31C. A resistance 78 interconnects brushes 34C and 35C. A resistance 79 interconnects brushes 32C and 33C. A resistance 80 has one of its terminals connected to the interconnected brushes 37C and 31C and the other terminal of resistance 80 is connected to the transformer terminal 70A.

In operation of the arrangement shown in FIGURES 1 and 2, the magnetizable tape 10, which for these present purposes may be considered to be a dielectric material, is maintained in a stationary condition when the switches 75 and 76 are in their positions illustrated in FIGURE 2. Under this particular condition it will be seen that a voltage is applied between belt 36 and belt 37 and a voltage is also applied between belts 31 and 30. There is mutual electrostatic attraction between the belt pair 36, 37 and also between the belt pair 30, 31, with the result that the tape 10 is maintained in a stationary clamped condition between these two belt pairs. To drive the belt in the forward position, i.e. from right to left with respect to the transducer 11 in FIGURE 1, the switch arm 76A, which may be the arm of a relay, is moved into engagement with the stationary contact 76B, in which case the belt pairs 36, 37 and 30, 31 are de-energized and a voltage is now applied between the constantly driven belt pairs 34 and 35 to produce a mutual electrostatic attraction force between the same for coupling the continuously moving belt 35 to the tape 10 to drive the same at the same linear speed as the linear speed of belt 35. Tape movement thereafter may be quickly stopped by returning the switch arm 76A to its engaging position with contact 76C.

Reversal of tape movement is accomplished by moving the switch arm 75A, which may be a switch arm of a relay, into engagement with the stationary contact 75B, in which case the voltage across belt pairs 36, 37 and 30, 31 is removed and voltage now appears across the tape pair 32, 33 to produce mutual electrostatic attraction between the constantly driven belts 32 and 33 and establish a coupling between the continuously moving belt 33 and tape 10 to thereby move the tape 10 in the reverse direction at the same linear speed as the continuously moving belt 33.

It will be seen from the foregoing operation that the switches 75 and 76 are operated independently and that tape movement may be reversed regardless of the position of switch 76.

The resistors 78, 79 and 80 are referred to as bleeding resistors since they are used to dissipate electrostatic energy which may be present in the capacitors defined by adjacent belts. Thus, for example, it will be seen that a capacitor is defined between brushes 34C, 35C with the dielectric of the capacitor being the insulated belt portions 34A, 35A and the tape 10. Like capacitors are defined between brushes 36 and 37, and also between brushes 30C and 31C, and also between brushes 32C and 33C. The bleeding resistances 78 and 79 may each have an ohmic value of 220,000 ohms and the ohmic value of resistance 80 may be 110,000 ohms; and, for example, the tape 10 has a width of one-half inch, has a conventional thickness of approximately .0015 inch; and the width of the belts is approximately one-half inch each, with the thickness of the insulating portion of the belt being approximately one- to two-thousandths of an inch. In such case the thickness of the conductive coating on each belt may be approximately one-tenth to one-half of one-thousandth of an inch and preferably has a width less than the width of a belt as illustrated in FIGURES 2 and 3 and is centrally disposed thereof to avoid any possible arching of voltage around the edges of the belt.

Figure 4:
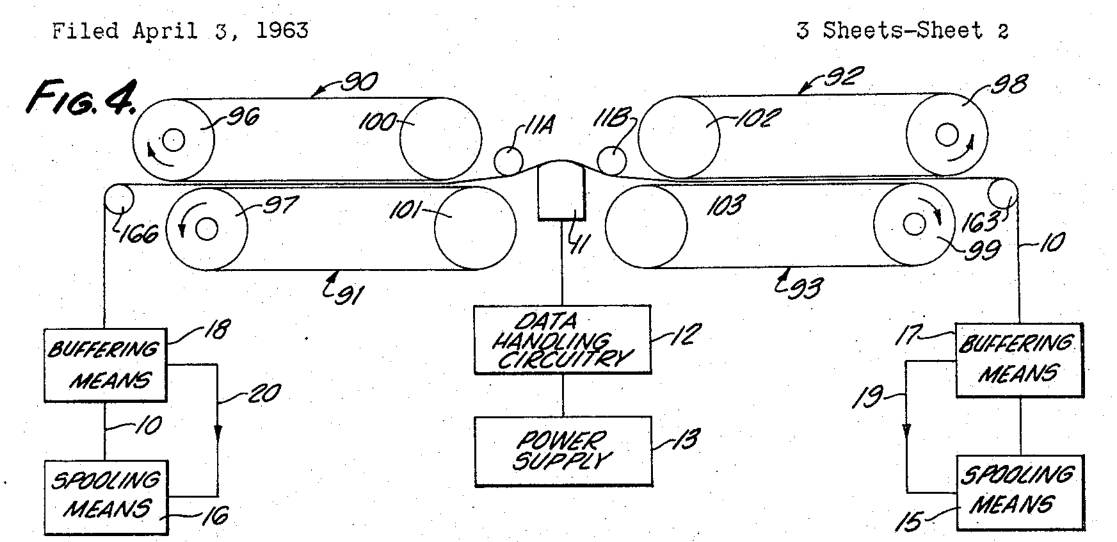
FIGURE 4 illustrates another system embodying features of the present invention.
Figures 5, 6, 7, 8, 8A, 17:
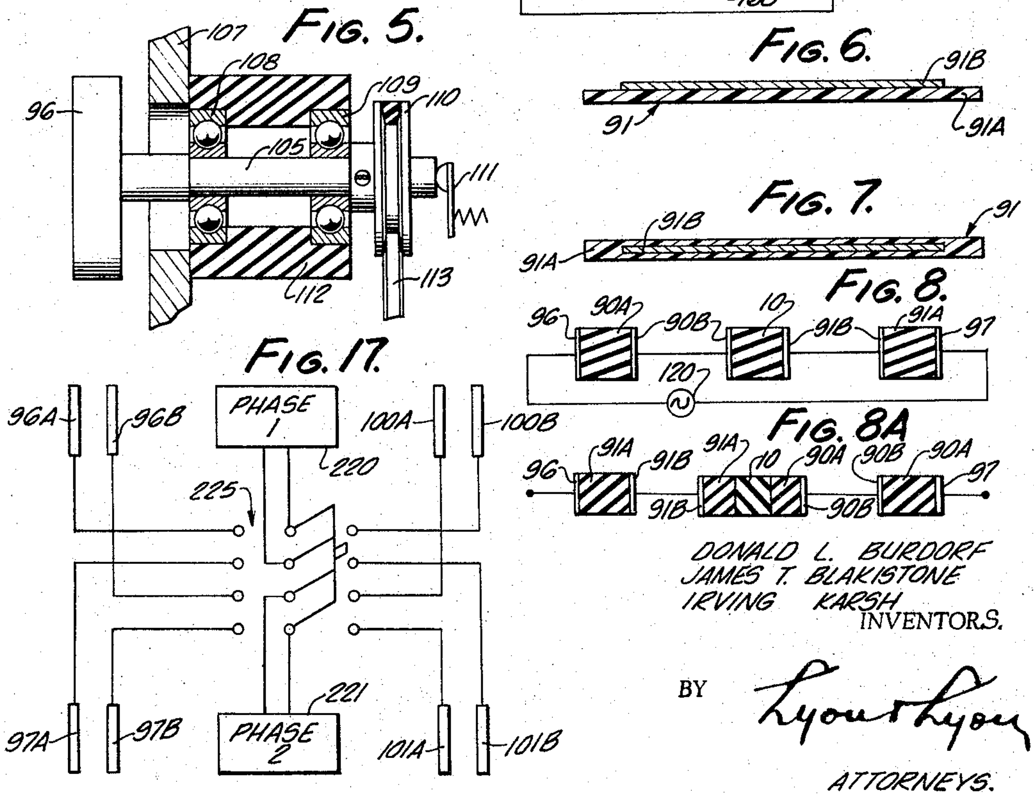
FIGURE 5 illustrates an insulating mounting for the driving rollers in FIGURE 4.
FIGURES 6 and 7 are cross-sectional views through different forms of belts used in the system shown in FIGURE 4.
FIGURES 8 and 8A illustrate equivalent electrical circuits involving three series-connected capacitors formed in the system shown in FIGURE 4 using different belt constructions.
FIGURE 17 illustrates another modification involving features of the present invention and using out-of-phase energizing voltages.

In the preferred form of the invention illustrated in FIGURE 4 wherein the buffering means, spooling means, transducer means and data-handling circuitry connected to such transducer means are as described above in FIGURE 1, there is provided two pairs of belts 90, 91 and 92, 93 with each belt having a cross section as illustrated either in FIGURE 6 or FIGURE 7. As shown in FIGURE 6, there is a conductive coating 91B on the outer surface of the Mylar belt 91A. In FIGURE 7 the Mylar belt 91A has embedded therein conductive material 91B, also in the form of a belt.

In FIGURE 4 there are four continuously driven and rotating rollers 96, 97, 98 and 99, each rotating as indicated by the arrows in FIGURE 4, and four stationary posts 100, 101, 102 and 103. These posts 100–103 may be in the form of rollers that are stationary, i.e. prevented from rotating. Belt 90 passes over roller 96 and post 100. Belt 91 passes over roller 97 and post 101. Belt 92 passes over roller 98 and post 102. Belt 93 passes over roller 99 and post 103.

Each of these four rollers and each of these four posts are insulatedly mounted such that voltages may be applied to each on an individual basis. One way in which such rollers and posts may be so insulatedly mounted is illustrated in connection with FIGURE 5 which specifically illustrates the mounting of one of the four driven rollers 96, 97, 98, 99.

In FIGURE 5 the belt roller 96 has its shaft 105 passing through an enlarged opening in the stationary supporting frame member 107, a part of the tape deck, and also through the inner race of each of the two spaced ball-bearing assemblies 108 and 109. Also, such shaft 105 has affixed thereto a belt drive pulley 110 for driving roller 96. The pulley 110 is driven by a motor (not shown) through a belt 113 of insulating material. A spring electrical contact 111 is biased into engagement with the end of shaft 105 for purposes of making an electrical connection to the metal roller 96 through the metal shaft 105. The outer race members of the bearing assemblies 108 and 109 are recessed within a block of insulating material 112 which is secured to the frame member 107. The stationary posts 100–103, both inclusive, are mounted in like manner, as illustrated in FIGURE 5, but since such posts 100–103 are stationary, there is no necessity for the pulley 110 nor the bearing assemblies 108 and 109, and thus the shaft 105 is stationarily supported in and by the stationary block of insulating material 112. It will be seen that it is not necessary to make the rollers 100–103 of cylindrical configuration as illustrated in FIGURE 4, and the same may be generally arcuate post members having an arcuate portion only where the same contacts a belt.

The length of each of these belts 90–93, both inclusive, is slightly greater than that required to go around a driving roller and a post so that the belt is loosely mounted and normally under no or very little tension. Thus, normally, because of this loose mounting of belts, they are not driven by the continuously rotating rollers 96, 97, 98 and 99. Such loose mounting of the belts minimizes friction and wear on the belts.

It will be seen that a capacitor circuit is provided between adjacent rollers and adjacent posts in FIGURE 4 and such capacitor circuitry is illustrated in connection with FIGURE 8 wherein it is assumed that an AC voltage source 120 has one of its terminals connected to the roller 96 (represented as a capacitor plate 96 in FIGURE 8) and the other one of its terminals connected to roller 97 (represented as the capacitor plate 97 in FIGURE 8). Also, in FIGURE 8 the belt 90 (of the form shown in FIGURE 6) has its insulating Mylar portion represented as dielectric material 90A and its conductive coating as the capacitor plate 90B. Likewise, the insulating Mylar of belt 91 is represented in FIGURE 8 as the dielectric material 91A and the conductive coating on belt 91 is represented as the capacitor plate 91B. The tape 10, which extends between the belts 90 and 91 and more specifically between the conductive coatings on such belt and represented by capacitor plates 90B and 91B, is represented in FIGURE 8 as the dielectric material 10. It will thus be seen, using belts of the construction shown in FIGURE 6, that three series capacitors are formed. Using a belt as shown in FIGURE 7, a like series circuit of capacitors is formed but in such case the center capacitor not only has the dielectric material represented by the tape 10 but also portions of the dielectric material of belts 90 and 91, each of which is constructed as shown in FIGURE 7. This equivalent circuit is shown in FIGURE 8A. It will be seen that in this instance the web 10 may either be a dielectric or a metal and when a metal, the equivalent circuit then comprises four series capacitors. This arrangement using encapsulated conductive belts as shown in FIGURE 7 is particularly useful when the web is a perforated paper web.

Figure 9:
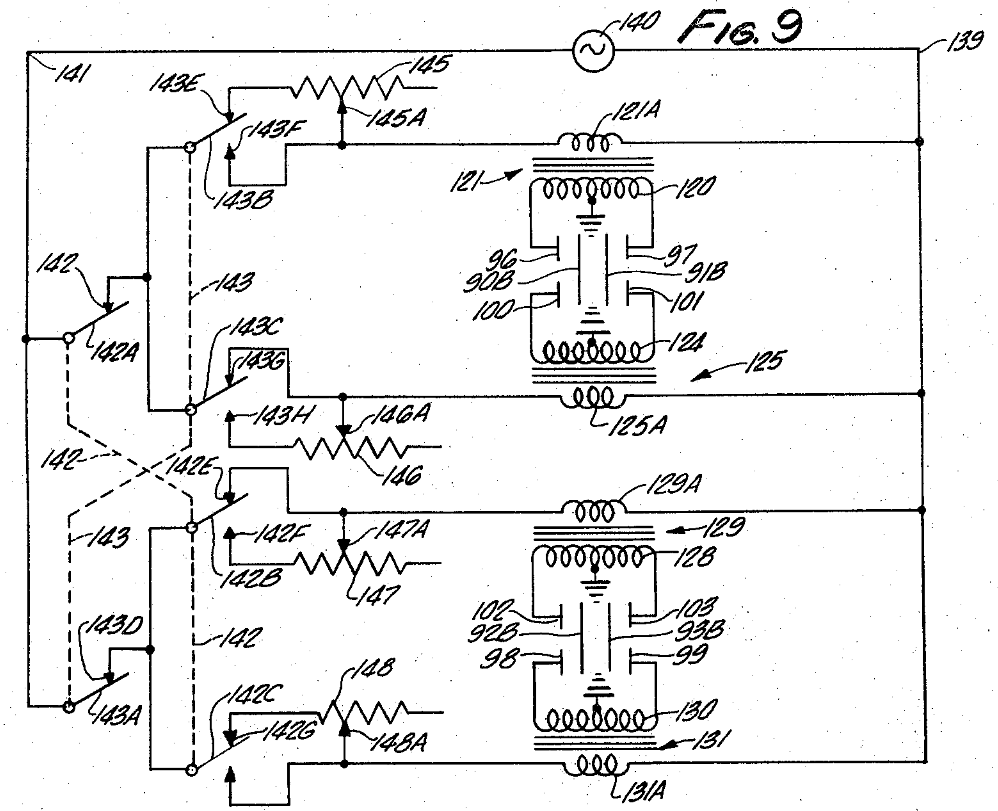
FIGURE 9 illustrates a control circuit incorporated in the system shown in FIGURE 4.

Using the equivalent electrical circuit developed in connection with FIGURES 8 and 8A, FIGURE 9 illustrates the electrical control circuit for the arrangement shown in FIGURE 4 when belts constructed as shown either in FIGURE 6 or FIGURE 7 are used. Thus, for example, the AC source shown in FIGURE 8 is represented in FIGURE 9 as the secondary winding 120 of transformer 121, a step-up transformer. Such winding 120 has a grounded center tap with one of its outside terminals being connected to roller 96, represented as a capacitor plate, the other outside terminal of secondary winding 120 being connected to roller 97, represented as a capacitor plate in both FIGURES 8 and 9.

Also in FIGURE 9, the conductive coating 90B, which, of course extends circumferentially around belt 90, is represented as a larger capacitor plate 90B; and likewise, the conductive coating 91B on belt 90 is represented as the large capacitor plate 91B in FIGURE 9. These capacitor plates 90B and 91B in FIGURE 9 extend also between capacitor plates 100 and 101 which are representative respectively of stationary posts 100 and 101. The posts 100 and 101 are connected across the outside terminals of secondary winding 124 of transformer 125, the center tap of winding 124 being grounded as, for example, being connected to the metallic part of the tape deck, which is at a reference potential, i.e. ground potential.

In FIGURE 9 the driven rollers 98 and 99 and posts 102 and 103 are each represented as a capacitor plate between which are disposed the capacitor plates 92B and 93B representative respectively of the conductive coatings 92B and 93B on belts 92 and 93. The posts 102 and 103 are connected across outside terminals of the secondary winding 128 of transformer 129, a step-up transformer which has the center tap on its secondary winding grounded. Similarly, the rollers 98 and 99 are connected across the outside terminals of the center-tapped secondary winding 130 of step-up transformer 131, the center tap of winding 130 being grounded.

The primary winding of each of transformers 121, 125, 129 and 131 each have one of their terminals connected to terminal 139 of AC source 140, the other terminal 141 of source 140 being selectively connected through switching means, described below, to the other terminals of such primary windings for energizing the corresponding transformers.

Terminal 141 is connected to the movable switch arm 142A of a three-pole switch having the other two poles or arms 142B and 142C, such three arms being mechanically interconnected or interlocked as indicated by the dotted line 142. These three arms may be arms or poles of a relay. The terminal 141 is also connected to the switch arm or pole 143A of a three-pole switch having the other two arms or poles 143B and 143C, these three arms being interconnected mechanically or interlocked as indicated by the dotted line 143; and likewise, these three switch arms may comprise elements of a control relay.

The stationary contact 142D, normally contacted by switch arm 142A, is connected to the switch arms 143B and 143C; and similarly, the stationary contact 143D, normally contacted by switch arm 143A, is connected to the movable switch arms 142B and 142C.

Switch arm 143B normally contacts the stationary contact 143E which is connected to one terminal of resistance 145 having an adjustable tap 145A thereon connected to the other stationary contact 143F and one terminal of primary winding 121A, the other terminal of such winding 121A being connected to the source terminal 139. The switch arm 143C normally engages the stationary contact 143G which is connected to adjustable tap 146A on resistance 146 and also to one terminal of primary winding 125A having its other terminal connected to the source terminal 139. An outside terminal of resistance 146 is connected to stationary contact 143H engageable with arm 143C.

Switch arm 142B normally engages stationary contact 142E which is connected to an adjustable tap 147A on resistance 147 and to one terminal of primary winding 129A having its other terminal connected to the source terminal 139. An outside terminal of resistance 147 is connected to the stationary contact 142F which is engageable with the switch arm 142B.

The switch arm 142C normally engages the stationary contact 142G which is connected to one terminal of adjustable resistance 148 having its adjustable tap 148A connected to stationary contact 142H and one terminal of primary winding 131A, the other terminal of such winding being connected to the source terminal 139.

In general, in operation of the system shown in FIGURE 4, an AC voltage is applied between rollers 96 and 97 to produce a coupling of belts 90 and 91 with the tape 10 to drive the tape 10 in its forward direction, i.e. from right to left in FIGURE 4; and to drive the tape in the reverse direction, an AC voltage is applied between the rollers 98 and 99 to establish a coupling or driving connection of the belts 92, 93 with the tape 10. Tape movement is stopped by applying an AC voltage between posts 100, 101 and/or between posts 102, 103 to establish a coupling between the belts and corresponding stationary posts to thereby effectively lock the tape 10 with respect to such stationary posts. In the stationary or locked condition of tape 10, the rollers 96, 97, 98, 99 continuously rotate but in view of the loose arrangement of the belts on these drive rollers, the belts remain in a stationary condition. The general principle of operation is incorporated in the modified arrangements shown in FIGURES 10 and 11.

Figures 10, 11:
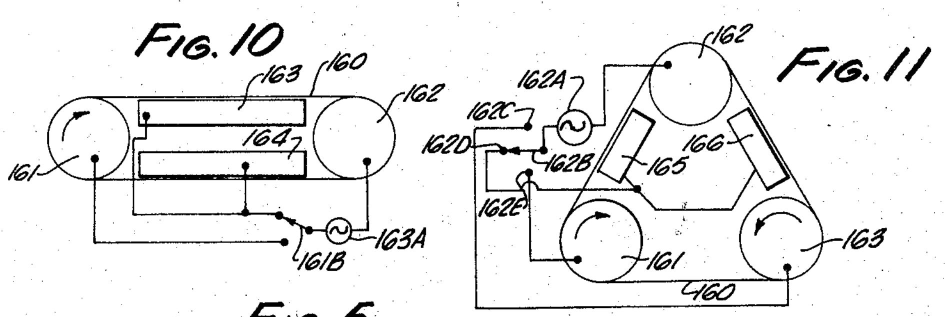
FIGURE 10 illustrates another form of clutching arrangement involving features of the present invention.
FIGURE 11 illustrates another clutching arrangement embodying features of the present invention.

In FIGURE 10 there is provided a loose belt 160 of the form illustrated either in FIGURE 6 or FIGURE 7 passing over a continuously driven roller 161 and a shaft 162. The roller 161 is representative of a driving shaft, and the roller 162 is representative of a driven shaft. Intermediate these rollers or shafts 161, 162 are a pair of conductive plates or posts 163, 164. Application of voltage between the rollers or shafts 161 and 162 produces electrostatic attraction between the driving roller 161 and belt 160 and also between belt 160 and shaft or roller 162, thus coupling the driving shaft or roller 161 to the driven shaft or roller 162 to thereby establish a driving connection between the same. Application of AC voltage between the plates or stationary posts 163, 164 produces a coupling of such stationary plates with the belt 160 to thereby maintain belt 160 stationary, in which case the shaft 161 is decoupled from shaft 162. The arrangement shown in FIGURE 10 serves to rotate the driven shaft 162 in one direction only; and to produce rotation of a driven shaft in either one of two directions, an intermediate roller is used as now described in connection with FIGURE 11.

In FIGURE 11 the belt 160, of the character illustrated in either FIGURE 6 or FIGURE 7, is loosely mounted on the three rollers or shafts 161, 162, 163 and a first stationary plate or post 165 is between rollers 161 and 162 and a second stationary post or plate 166 is positioned between rollers 162 and 163. The rollers 161 and 163 are continuously driven rollers or shafts and are each insulated from each other, the roller 161 rotating in the clockwise direction and the roller 163 rotating in the counterclockwise direction. It is desired to selectively couple the driven shaft or roller 162 with respect to either the driving roller 161 or 163. To couple the rollers 161 and 162, an AC voltage is applied between the same. To selectively couple the roller 163 to the driven roller 162, an AC voltage is applied between the rollers 162 and 163. To stop movement of belt 160, an AC voltage is applied between the stationary posts or plates 165, 166 and roller 162.

In the operation of the system shown in FIGURE 4, it has been observed that a problem may be encountered as a result of the following considerations. When an AC actuating voltage is applied between rotating capstans 96, 97, an AC voltage is established on the conductive coating 90B of belt 90 and conductive coating 91B of belt 91 as will be seen from an inspection of FIGURE 8 wherein the equivalent circuit comprises three series-connected capacitors. Under these conditions, when stationary posts 100, 101 are disconnected from their normal braking or stopping AC voltage source, i.e. have a "floating" potential, theoretically stationary posts 100 and 101 should achieve the same voltage level as the belts 90 and 91. However, it has been observed that in some cases a sufficiently strong attractive force is developed between the belts and stationary posts 100, 101 tending to stop movement of the belts and thereby offsetting the attractive force between the belts and rotating rollers 96, 97 effective to move the belts. This undesirable condition is believed to be due to the very high impedance characteristics of the system wherein a relatively small amount of charge leakage, or stray capacitance may establish a voltage level on the stationary posts substantially different from the level of voltage dictated solely by voltages on the conductive portions of the tapes. To eliminate or prevent such undesirable retarding action at the stationary posts 100, 101, these posts are not allowed to float in potential but means are incorporated to impress a stabilizing or equalizing voltage on the posts 100, 101 of sufficient intensity and phase to maintain the voltage on such posts at substantially the same level as that on the belt coatings; and such stabilizing means, involving adjustable resistances 145, 146, 147, 148, are incorporated in the control circuit shown in FIGURE 9, the operation of which is now described.

In FIGURE 9, the switches as shown are in their normal positions corresponding to braking or maintenance of tape 10 in its stationary condition. In such case, full voltage corresponding to the voltage of source 140 is applied to (1) primary winding 125A through switch arms 142A and 143C to apply maximum voltage between stationary posts 100, 101, and (2) primary winding 129A through switch arms 143A and 142B to apply maximum voltage between stationary posts 102, 103; and a reduced voltage established by the adjustment of resistances 145 and 148 is applied to corresponding primary windings 121A and 131A to, in turn, establish reduced stabilizing voltages correspondingly across rollers 96, 97 and 98, 99. In such case the primary winding 121A is energized through a series circuit which includes: switch arms 142A, 143E, resistance 145 and winding 121A; and primary winding 131A is energized through a series circuit which includes: switch arms 143A, 142C, resistance 148 and winding 131A.

To produce forward movement of the tape 10, the ganged switch arms 143A, 143B, 143C are actuated to their other position, in which case full voltage is applied to primary winding 121A to correspondingly apply maximum voltage between rollers 96, 97, the primary winding 121A being fully energized through a series circuit which includes: switch arms 142A, 143E and winding 121A. A stabilizing voltage is applied to stationary posts 100, 101, reduced voltage being applied for that purpose to primary winding 125A through a series circuit which includes: switch arms 142A, 143C, resistance 146 and winding 125A. Also, the switch 143A, 143D is now open, preventing energization of primary windings 129A and 131A, i.e. preventing the application of voltage between either posts 102, 103 and also between rollers 98, 99.

To stop movement of the tape 10, the ganged switch arms 143A, 143B, 143C are returned to their positions shown in FIGURE 9.

To reverse movement of the tape 10, the ganged switch arms 142A, 142B, 142C are actuated to their other positions, in which case full voltage is applied to primary winding 131A and a reduced stabilizing voltage is applied to primary winding 129A. The winding 131A is energized through a series circuit which includes: switch arms 143A, 142C and winding 131A to apply maximum voltage across rollers 98, 99. The winding 129A is energized through a series circuit which includes: switch arms 143A, 142B, resistance 147 and winding 129A to apply a stabilizing voltage across posts 102, 103. The switch 142A, 142D is now open, preventing energization of rollers 96, 97 and posts 100, 101.

Since the desirability of providing stabilizing or equalizing voltages, as described above in connection with FIGURE 9, arises from the fact that a single conductive coating passes over a roller and a post as indicated by the extended capacitor plates 90B, 91B, 92B, 93B in FIGURE 9, each of which forms an element in two different series capacitor circuits, the use of stabilizing or equalizing voltages may be obviated by providing a plurality of conductive coatings on a common belt with one conductive coating being common only to rollers and one or more other conductive coatings being common only to stationary parts or posts as now described in FIGURES 12–15 which serve to show modifications of the arrangement shown in FIGURE 4.

Figure 12:
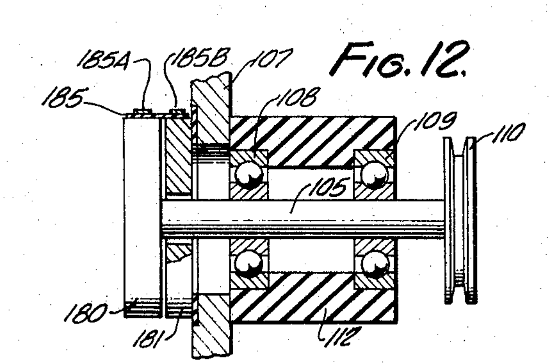
FIGURE 12 illustrates another form of belt drive, like FIGURE 5, useful in the system shown in FIGURE 4 and using belts as illustrated in FIGURE 13.
Figure 13:
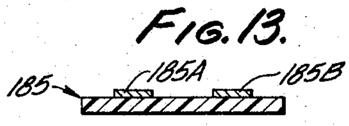
FIGURE 13 is a cross-sectional view of one of the belts which may be used in the system of FIGURE 4 when modified to incorporate the belt-driving means of FIGURE 12.
Figure 15:
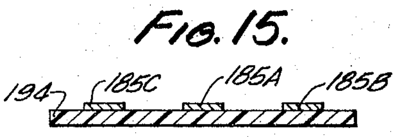
FIGURE 15 is a cross-sectional view through one of the belts in FIGURE 4 which is shown in modified form to cooperate with the belt-driving means of FIGURE 14.
Figure 14:
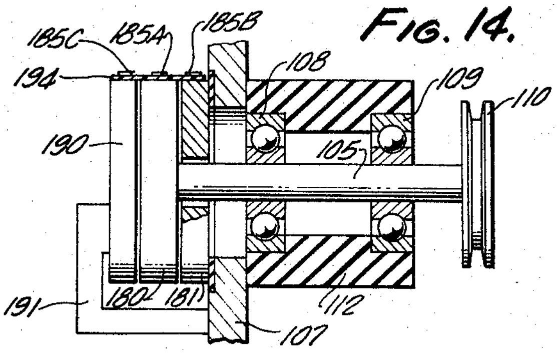
FIGURE 14 illustrates another form of belt-driving means, like FIGURES 5 and 12, which may be incorporated in the system of FIGURE 4 to use belts illustrated in FIGURE 15.

FIGURE 4 may be modified by substituting each of the rollers and posts shown therein for the arrangement illustrated either in FIGURES 12 and 13 or in FIGURES 14 and 15, with the slack belt arrangement and relative positioning of the axes of the different rollers and posts in FIGURE 4 being retained.

In FIGURE 12 there is provided one driven roller 180 insulatedly mounted as described in FIGURE 5, together with an insulated stationary disc 181 of metal, the disc 181 being mounted on frame member 107. A Mylar belt 185, as shown in enlarged form in FIGURE 13, having two spaced circumferential conductive coatings 185A and 185B, is used with the conductive coating 185A in alignment with the roller 180 and the other conductive coating 185B in alignment with the arcuate contact plate 181 as illustrated in FIGURE 12.

With reference to FIGURES 14 and 15, an additional stationary insulated disc 190 of metal is mounted on frame member 107 by bracket member 191 of insulating material. In this case, as illustrated in enlarged form in FIGURE 15, the Mylar tape 194, also of one-half inch width as in FIGURE 13, has an additional circumferentially extending conductive coating 185C which is in alignment with the additional stationary metal contact plate 190 as illustrated in FIGURE 14. The arrangement shown in FIGURE 14 is preferred over that shown in FIGURE 12 since the roller conductive strip 185A is centrally disposed of the tape 194 and also the strips 185B and 185C are symmetrically arranged on the tape to achieve better balanced forces.

The arrangement of FIGURE 4 so modified by either FIGURE 12 or 14 may be controlled as in FIGURE 9 which is then simplified by removing resistances 145, 146, 147 and 148 and interchanging the rollers and arcuate contact plates of FIGURES 12 and 14 for corresponding elements in FIGURE 9.

The described switching in FIGURE 9 may be accomplished equally well using solid state switching elements.

The conductive belt coatings in FIGURES 13 and 15 may, instead of being external to the belt, be embedded in the belt as taught in FIGURE 7 and thus be particularly useful, as is also FIGURE 7, when the tape 10 is a perforated tape, since in such case the coatings are entirely insulated without voltage flashing over between adjacent belts and through perforations in tape 10.

Another problem which has been observed in systems of this type wherein a dielectric belt contacts a roller or pulley energized by an AC voltage involves the fact that a surface charge may be transferred to the belt. As the belt moves away from the pulley, the charge on the belt remains static, while the charge on the pulley continues to vary. After a half voltage cycle, a peak-to-peak voltage exists between the belt charge and the roller or pulley, separated only by air. When the frequency of the AC source is high, the separation distance is, during a half voltage cycle, small and an arc from pulley to belt can occur, causing an erosion of the belt surface. When this eroded surface returns to the charged pulley, it may now break down under the voltage differential between the pulley and conductive coating on the belt.

In systems in which coated belts are driven by tension from rotating pulleys as in FIGURE 1, the problem may be obviated by a conductive coating on both sides of the belt. In such case, a charge is placed on one pulley or roller which is transferred by contact to the inner conductive coating. This charge is transferred capacitively to the outer conductive coating. Since the capacity involved is proportional to the full area of the belt, which is relatively large, the voltage drop across the dielectric of the belt is low. Also, the inner conductive coating prevents a static charge from being left on the belt which can cause belt erosion as previously described.

Figure 16:
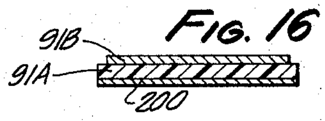
FIGURE 16 is a cross-sectional view through another form of belt which is representative of other forms of belts which may be used in the systems illustrated in FIGURES 1 and 4.

In a system using loose belts as described in connection with FIGURE 4, the problem of the belt maintaining a static charge may be overcome by coating the inner surface of the belt with a high resistance coating. The resistance of the coating is such that it is low enough to allow rapid neutralizing of the charges left on the belt as it separates from the pulley, but high enough to limit current flow between the rotating roller and the fixed post to a low value. The static charges will neutralize themselves if allowed to move through a high resistance coating because the integrated charge left on the belt by the AC voltage is zero. A belt so coated on both sides is illustrated in FIGURE 16 wherein the belt of FIGURE 6 is modified to provide a conductive coating 200 extending the full width of the belt.

It will be noted that during accelerating and stopping periods, finite slip occurs between conductive pulleys and the conductive belts and the web being driven. Such slip causes a surface charge to be set up on the dielectric, tending to neutralize the charge on the conductive element. Consequently, it is considered necessary at this time to use an energizing voltage which is an alternating voltage to constantly change polarization, otherwise the attractive forces will be lost. Use of an alternating sine-type wave provides a net (RMS) attractive force. However, when, for example, a sine wave voltage is used, the voltage does not change at the peaks and the attractive forces may be lost twice each cycle of the voltage wave. If desired, this condition may be obviated or improved using two sine wave sources which are out of phase, preferably ninety degrees out of phase. In such case each belt is provided with two or more parallel striped conductive sections, as illustrated, for example, in FIGURE 13, and there are two or more corresponding sections on the rollers and stationary posts and voltages of different phases are applied individually to such sections for starting and stopping tape as described above. In such case the attractive forces developed during either starting, running or stopping never drop to zero on both sections simultaneously.

This arrangement is illustrated in FIGURE 17 wherein there are two AC sources 220 and 221, which are preferably ninety degrees out of phase, connected to the movable arms of four-pole, double-throw switch 225 having individual ones of a set of stationary contacts connected respectively to the roller sections 96A, 96B (corresponding to 96 in FIGURE 4) and to the roller sections 97A, 97B (corresponding to roller 97). Individual ones of the other set of stationary switch contacts are connected respectively to the post sections 100A, 100B (corresponding to post 100 in FIGURE 4) and to the post sections 101A, 101B (corresponding to post 101). This arrangement illustrated in FIGURE 17 may, in accordance with the teachings herein, be incorporated in other systems described herein since it essentially involves duplication of voltage sources, duplication of roller and post sections and corresponding duplication of conductive sections on the belts.

In all cases the belt may have a width of approximately one-half inch, may be of Mylar having a thickness of one- to two-thousandths of an inch (.001" to .002") and the conductive coatings may have a thickness of one-half of one-thousandth of an inch (.0005"). The normal separation of the parallel extending reaches of adjacent belts is approximately five-thousandths of an inch (.005").

The transducer means may comprise seven individual heads, one for each tape channel in each of which there are 200 bits of magnetic information per channel per lineal inch of tape, with the separation between bits being approximately five-thousandths of an inch (.005").

In FIGURE 1, the pulleys 54, 55 and 50, 51 may each be driven pulleys, but it is preferred that the pulleys 54 and 51 be constantly driven such that the linear belt speeds are all the same so that the belts 34 and 32 need not be accelerated when the tape is electrostatically clamped between belts 34, 35 or between 32 and 33, as the case may be.

Preferably, as shown in FIGURE 4, the centers of rotation of the driving rollers or pulleys 96, 97, and likewise the centers of stationary posts 100 and 101, do not lie on a vertical line to minimize mechanical tolerance requirements and to effect a larger separation between pulleys (and posts) for minimizing voltage flash-over between pulleys.

Also, in some cases the belts used in the arrangement shown in FIGURE 1 may be a plastic material impregnated with conductive particles such that the belt may have large conductivity, but in the arrangement shown in FIGURE 4, the conductivity would be low comparable to the conductivity provided by the high resistance film 200 in FIGURE 16.

It is noted that the drive belts shown in FIGURE 1 may be constructed as shown in FIGURE 7. Also, the so-called polyphase belts in FIGURES 13 and 15 may have their conductive portions embedded in a dielectric as illustrated and described in connection with FIGURE 7.

Also, the source represented by source 120 is preferably a square wave source having a frequency of, for example, 300 cycles per second, the square wave due to its extremely short rise time being preferred because then there is no appreciable time delay in starting tape movement.

In FIGURE 18, illustrating modifications of the present invention, the pulleys 300 and 301 are fixed pulleys or posts with a slack belt 302 extending around such pulleys or posts, the belt 302 as shown in FIGURE 19 being of dielectric material 304 with a conductive coating 305 thereon contacting the pulleys 300, 301. The belt 307, constructed as shown in either FIGURE 6 or FIGURE 7, is either a tight belt or a slack belt extending around the constantly rotating drive pulley 309 and pulley 310. When the belt 307 is slack, the pulley 310 may be fixed to constitute a stationary post. In either case when an alternating voltage is applied between pulleys 300 and 309, there is electrostatic attraction between the belts 302 and 307 to clamp the tape therebetween to drive the same. To stop movement of the tape, an alternating voltage is applied between the stationary pulleys 301 and 310 when the belt 307 is a slack belt.

While in certain instances above dielectric materials have been referred to as Mylar, it should be understood that other dielectric materials such as, for example, Tedlar (T.M.) may be used. The present invention, however, is not considered limited to the use of any specific type of dielectric material.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, a first constantly rotating and insulated pulley, a second constantly rotating and insulated pulley, a first insulated post, a second insulated post, a first belt loosely extending over said first pulley and said first post and normally being in nondriving relationship to said first pulley, a second belt extending over said second pulley and said second post and normally being in nondriving relationship to said second pulley, means for apply an AC voltage between said first and second pulleys, said means comprising a transformer having a center-tapped secondary winding with the center tap thereon being grounded and with the outside terminals thereof being connected respectively to a corresponding pulley, means for apply an AC voltage between said posts, the last-mentioned means comprising a transformer having a center-tapped secondary winding with the center tap of the last-mentioned winding being grounded and with the outside terminals of the last-mentioned winding being connected respectively to a corresponding one of said posts.

2. A system as set forth in claim 1 including means for applying an equalizing voltage between said posts when an AC voltage is applied between said pulleys, and means for applying an equalizing voltage between said pulleys when a voltage is applied to said post.

3. In a system of the character described wherein it is desired to act on a tape to move it in a forward direction, a reverse direction and to stop its movement, the combination comprising, a first pair of generally parallel extending endless belts between which said tape extends for electrostatically sandwiching therebetween, a second pair of generally parallel extending endless belts between which said tape extends for electrostatically sandwiching therebetween, means for energizing said first pair, means for energizing said second pair, electrostatic braking means cooperating with said tape to stop it, and means energizing said braking means, each of said belts extending loosely over a constantly rotating pulley in nondriving relationship thereto, each of said belts extending loosely over a stationary post with said post forming a part of said electrostatic braking means.

4. A system as set forth in claim 3 in which said pulleys and posts are of metal, and said belts have a coating of insulating material which contacts such posts and pulleys, means for apply an AC voltage between pulleys for belts which comprise a pair, and means for applying an AC voltage to posts for belts comprising a pair.

5. A system as set forth in claim 3 in which each of said belts has a conductive coating contactable with the tape.

6. A system as set forth in claim 3 in which each of said belts comprises a central conductive portion embedded in insulating material.

7. A system as set forth in claim 4 including means for applying an equalizing voltage to said posts when said pulleys are energized, and means for applying an equalizing voltage to said pulleys when said posts are energized.

8. In a system of the character described, a first constantly rotating and insulated pulley, a second constantly rotating and insulated pulley, first stationary means insulatedly mounted adjacent said first pulley, second stationary means insulatedly mounted adjacent said second pulley, a first belt passing over said first pulley and said first stationary means, a second belt passing over said second pulley and said second stationary means, said first belt having a plurality of conducting portions one of which overlies said first pulley and one of which overlies said first stationary means, said second belt having a plurality of conducting protions one of which overlies said second pulley and a second portion of which overlies said second stationary means, said first stationary means comprising two stationary portions on opposite sides of said first pulley, and said second stationary means comprising two stationary portions on opposite sides of said second pulley, and conductive portions on said first belt overlying said first stationary portions and conductive portions on said second belt overlying said stationary portions associated with said second pulley.

References Cited

UNITED STATES PATENTS

| | | | |
|---|---|---|---|
| 2,576,882 | 11/1951 | Koole et al. | 226—94 X |
| 2,825,558 | 3/1958 | Devaud | 226—94 |
| 2,826,408 | 3/1958 | Beveridge et al. | 226—94 |
| 2,831,678 | 4/1958 | MacNeill | 226—94 X |
| 2,859,962 | 11/1958 | Beveridge et al. | 226—94 |
| 2,880,997 | 4/1959 | Brown. | |
| 2,956,718 | 10/1960 | Beveridge et al. | 226—94 X |

ROBERT B. REEVES, *Primary Examiner.*

WILLIAM B. LA BORDE, RAPHAEL M. LUPO, *Examiners.*

C. AOUSSAT, *Assistant Examiner.*